(12) United States Patent
Harada et al.

(10) Patent No.: US 9,150,762 B2
(45) Date of Patent: Oct. 6, 2015

(54) MATERIAL SELF-ASSEMBLY METHOD AND SELECTIVE ADHESION METHOD BASED ON MOLECULAR RECOGNITION

(75) Inventors: Akira Harada, Suita (JP); Ryosuke Kobayashi, Suita (JP); Hiroyasu Yamaguchi, Suita (JP); Akihito Hashidzume, Suita (JP); Yoshinori Takashima, Suita (JP)

(73) Assignee: Osaka University, Suita (JP)

( * ) Notice: Subject to any disclaimer, the term of this patent is extended or adjusted under 35 U.S.C. 154(b) by 62 days.

(21) Appl. No.: 13/822,918

(22) PCT Filed: Sep. 8, 2011

(86) PCT No.: PCT/JP2011/070502
§ 371 (c)(1),
(2), (4) Date: Mar. 13, 2013

(87) PCT Pub. No.: WO2012/036069
PCT Pub. Date: Mar. 22, 2012

(65) Prior Publication Data
US 2013/0172479 A1  Jul. 4, 2013

(30) Foreign Application Priority Data
Sep. 14, 2010 (JP) .................................. 2010-205565

(51) Int. Cl.
| | | |
|---|---|---|
| C09J 105/16 | (2006.01) |
| C08L 33/04 | (2006.01) |
| C08L 33/24 | (2006.01) |
| C08L 33/26 | (2006.01) |
| C08L 101/02 | (2006.01) |
| C08G 83/00 | (2006.01) |
| C08J 3/075 | (2006.01) |
| C08F 220/54 | (2006.01) |

(52) U.S. Cl.
CPC ............. *C09J 105/16* (2013.01); *C08G 83/008* (2013.01); *C08J 3/075* (2013.01); *C08L 33/26* (2013.01); *C08L 101/02* (2013.01); *C08F 220/54* (2013.01); *C08J 2333/26* (2013.01)

(58) Field of Classification Search
None
See application file for complete search history.

(56) References Cited

FOREIGN PATENT DOCUMENTS
| | | |
|---|---|---|
| JP | 05-239157 A | 9/1993 |
| JP | 2002-537416 A | 11/2002 |
| WO | WO-00/48576 A1 | 8/2000 |

OTHER PUBLICATIONS

G. M. Whitesides et al., "Self-Assembly at All Scales," Science, 2002, vol. 295, pp. 2418-2421 and a cover page.

A. Harada et al., "Macroscopic self-assembly through molecular recognition," Nature Chemistry, Jan. 2011, vol. 3, No. 1, pp. 9-10 (1 page).

(Continued)

*Primary Examiner* — Vu A Nguyen
(74) *Attorney, Agent, or Firm* — Locke Lord LLP; James E. Armstrong, IV; Nicholas J. DiCeglie, Jr.

(57) ABSTRACT

The present invention provides a selective adhesion method and a self-assembly method for macroscale materials based on molecular recognition. One or more host bodies formed from a macromolecule having one or more host groups on the side chains, and one or more guest bodies formed from a macromolecule having one or more guest groups on the side chains are vibrated in a solvent to selectively form an assembly.

8 Claims, 3 Drawing Sheets
(3 of 3 Drawing Sheet(s) Filed in Color)

(56) References Cited

OTHER PUBLICATIONS

A. Harada, "Cyclodextrin-based ordered materials through self-organization," Abstract of Presentation at 2010 International Chemical Congress of Pacific Basin Societies, Dec. 2010 (1 page).

X. Y. Ling et al., "Reversible Attachment of Nanostructures at Molecular Printboards through Supramolecular Glue," Chemistry of Materials, 2008, vol. 20, No. 11, pp. 3574-3578.

X. Y. Ling et al., "Free-Standing 3D Supramolecular Hybrid Particle Structures," Angewandte Chemie International Edition, 2009, vol. 48, pp. 983-987.

International Search Report dated Nov. 15, 2011, issued for PCT/JP2011/070502.

Xuhong Guo et al., "Tailoring Polymeric Hydrogels through Cyclodextrin Host-Guest Complexation", Macromolecular Rapid Communications, vol. 31, No. 3, Feb. 2, 2010, pp. 300-304.

Akihito Hashidzume et al., "Macromolecular Recognition by Polymer-Carrying Cyclodextrins: Interaction of a Polymer Bearing Cyclodextrin Moieties with Poly(acrylamide)s Bearing Aromatic Side Chains", Macromolecular Rapid Communications, vol. 26, No. 14, Jul. 21, 2005, pp. 1151-1154.

Supplementary European Search Report dated Dec. 17, 2013 for EP Patent Application No. 11825072.9.

A. Harada et al., "Macroscopic self-assembly through molecular recognition," Nature Chemistry, Jan. 2011, vol. 3, No. 1, pp. 34-37.

MATERIAL SELF-ASSEMBLY METHOD AND SELECTIVE ADHESION METHOD BASED ON MOLECULAR RECOGNITION

TECHNICAL FIELD

The present invention relates to a selective adhesion method and a self-assembly method for materials based on molecular recognition.

BACKGROUND ART

Though many reports are available on molecular self-assembly, self-assembly of components of an observable size (macroscale self-assembly) is not well studied. There is a report of macroscale self-assembly that involves, for example, magnetic interaction, electrical interaction, hydrophilic-lipophilic balance, and capillary (Non-Patent Literature 1). However, there is hardly any report of self-assembly of macroscale materials based on molecular recognition.

CITATION LIST

Non-Patent Literature

NPL 1: Whitesides, G. M. & Grzybowski, B., Self-assembly at all scale, Science, 295, 2418-2421 (2002)

SUMMARY OF INVENTION

Technical Problem

It is an object of the present invention to provide a selective adhesion method and a self-assembly method for macroscale materials based on molecular recognition.

Solution to Problem

The present inventors conducted intensive studies over the foregoing problem, and found that an assembly can be formed when one or more host bodies formed from a macromolecule having one or more host groups on the side chains, and one or more guest bodies formed from a macromolecule having one or more guest groups on the side chains are vibrated in a solvent. It was also found that the host body and the guest body selectively form an assembly by molecular recognition. The present invention was completed after further studies based on these findings.

Specifically, the present invention provides a selective adhesion method and a self-assembly method for macroscale materials based on molecular recognition, as follows.

Item 1

An assembly comprising one or more host bodies formed from a macromolecule having one or more host groups in the side chains, and one or more guest bodies formed from a macromolecule having one or more guest groups in the side chains, wherein the one or more host bodies and the one or more guest bodies are in contact with each other and form the assembly.

Item 2

An assembly according to Item 1, wherein the association constant between the one or more host bodies and the one or more guest bodies is 50 or more.

Item 3

An assembly according to Item 1 or 2, wherein the one or more host bodies are a polymer having repeating units represented by the following general formulae (1) and (2)

[Chem. 1]

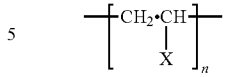

(1)

wherein X represents a hydroxyl group, $C(O)NH_2$, or $C(O)OH$, and n is 1 to 200,000,

[Chem. 2]

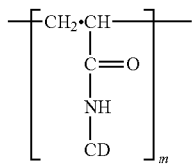

(2)

wherein CD represents α-cyclodextrin, β-cyclodextrin, or γ-cyclodextrin, and m is 1 to 200,000.

Item 4

An assembly according to Item 3, wherein the one or more host bodies are a copolymer of acrylamide and an acrylamide that has cyclodextrin on the side chain.

Item 5

An assembly according to Item 3 or 4, wherein the one or more host bodies are a gel of a crosslinked polymer having repeating units represented by the general formulae (1) and (2).

Item 6

An assembly according to any one of Items 1 to 5, wherein the one or more guest bodies are a polymer having repeating units represented by the following general formulae (1) and (3)

[Chem. 3]

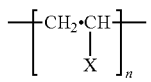

(1)

wherein X represents a hydroxyl group, $C(O)NH_2$, or $C(O)OH$, and n is 1 to 200,000,

[Chem. 4]

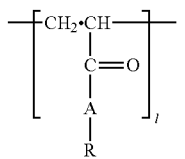

(3)

wherein A represents O or NH, R represents an optionally-substituted alkyl group, or an optionally-substituted aryl group, and l is 1 to 200,000.

Item 7

An assembly according to Item 6, wherein the one or more guest bodies are a copolymer of acrylamide and an acryl compound selected from the group consisting of an alkyl ester of acrylic acid, an aryl ester of acrylic acid, and an acrylamide having a cycloalkyl group on the side chain.

Item 8

An assembly according to Item 6 or 7, wherein the one or more guest bodies are a gel of a crosslinked polymer having the repeating units represented by the general formulae (1) and (3).

Item 9

A polymer that has one or more host groups and one or more guest groups on the side chains, and that has repeating units represented by the following general formulae (2) and (3)

[Chem. 5]

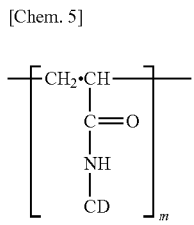

(2)

wherein CD represents α-cyclodextrin, β-cyclodextrin, or γ-cyclodextrin, and m is 1 to 200,000,

[Chem. 6]

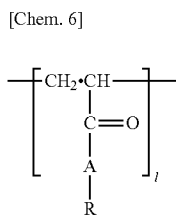

(3)

wherein A represents O or NH, R represents an optionally-substituted alkyl group, or an optionally-substituted aryl group, and l is 1 to 200,000.

Item 10

A gel formed by crosslinking of the polymer of Item 9.

Item 11

A method for selective adhesion of the gel of Item 10 through contact in an aqueous solvent.

Item 12

A method for causing one or more host bodies formed from a macromolecule having one or more host groups on the side chains, and one or more guest bodies formed from a macromolecule having one or more guest groups on the side chains to selectively adhere to each other through contact in an aqueous solvent.

Advantageous Effects of Invention

The present invention enables selective adhesion of macroscale molecules based on molecular recognition. The invention also enables selective adhesion and self-assembly, and selective adhesion in water upon appropriately selecting host-guest molecules.

BRIEF DESCRIPTION OF DRAWINGS

The patent application file contains at least one drawing executed in color. Copies of this patent or patent application with color drawings will be provided by the Office upon request and payment of the necessary fee.

DESCRIPTION OF EMBODIMENTS

Figure 1:
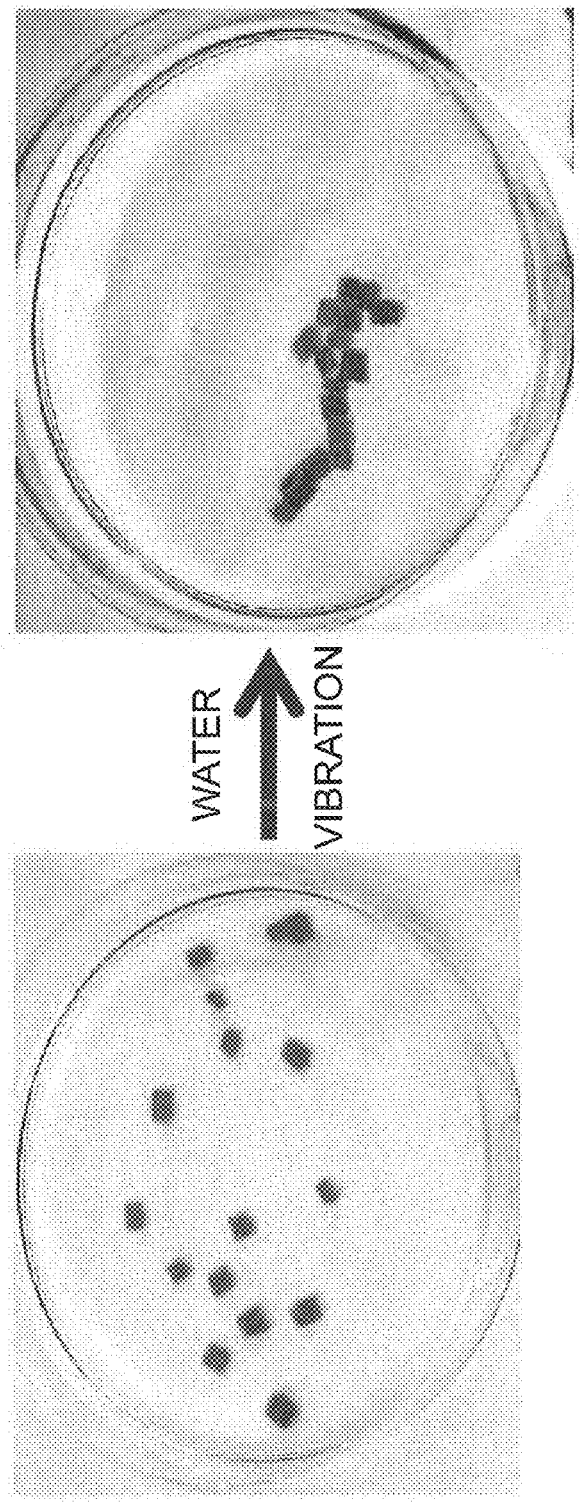
FIG. 1 is an image showing how a β-CD-gel (host body gel) and an Ad-gel (guest body gel) adhere to each other and form a self-assembly.

The present invention is described below in detail.

1. Host Body

The host body of the present invention is formed from a macromolecule having one or more host groups on the side chains.

Examples of the host groups include artificial host molecules such as derivatives of cyclodextrin (CD), calixarene, crown ether, cyclophane, and cucurbituril. Specific examples include α-cyclodextrin, β-cyclodextrin, γ-cyclodextrin, calix[6]arene sulfonate, calix[8]arene sulfonate, 12-crown-4,18-crown-6, [6]paracyclophane, [2,2]paracyclophane, cucurbit[6]uril, and cucurbit[8]uril. Of these, α-cyclodextrin, β-cyclodextrin, and γ-cyclodextrin are preferred.

Examples of the macromolecules having one or more host groups on the side chains include polymers having the repeating units represented by the foregoing general formulae (1) and (2). The number of repeating units (n, m) in the polymers having the repeating units represented by the foregoing general formulae (1) and (2) is 1 to 200,000, preferably 5,000 to 15,000.

The macromolecules having the repeating units represented by the general formulae (1) and (2) may be produced by, for example, the reaction of the monomer of the following general formula (4) with the monomer of the general formula (5) below.

[Chem. 7]

(4)

wherein X represents a hydroxyl group, $C(O)NH_2$, or $C(O)OH$.

[Chem. 8]

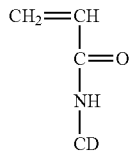

(5)

wherein CD represents α-cyclodextrin, β-cyclodextrin, or γ-cyclodextrin.

Any known monomer compounds may be used as the water-soluble monomers represented by the general formula (4). The monomer compounds may be used either alone or in a combination of two or more.

Particularly preferred as the monomer of the general formula (4) is the compound in which X is C(O)NH$_2$, specifically, acrylamide.

The monomer represented by the general formula (5) is produced by the reaction of acryloyl chloride with 6-aminocyclodextrin. Typically, acryloyl chloride and 6-aminocyclodextrin are mixed and stirred in a solvent.

The reaction may be performed either solvent-free, or with a solvent (an organic solvent or an aqueous solvent) commonly used in organic synthesis reactions. Examples of the organic solvent include dimethylsulfoxide (DMSO), and dimethylformamide (DMF). Examples of the aqueous solvent include water, and buffers that contain salts such as sodium phosphate and sodium carbonate as required. When used, the amount of the solvent may be appropriately adjusted.

The monomer of the general formula (5) may also be produced by using a method in which 1,1'-carbonyldiimidazole (CDI) or 1-ethyl-3-(3-dimethylaminopropyl)carbodiimidehydrochloride (EDC) is added to acrylic acid under ice-cooled conditions, and aminocyclodextrin is added to the mixture and stirred overnight to form an amide bond. Alternatively, the monomer of the general formula (5) may be produced by obtaining an amide compound from acrylic acid via an active ester, using dicyclohexylcarbodiimide (DCC) and 1-hydroxybenzotriazole (HOBt) or N-hydroxysuccinimide (HOSu) as condensing agents.

The monomer of the general formula (5), and the known monomer of the general formula (4) are reacted to produce the polymer having the repeating units of the general formulae (1) and (2). Preferably, the polymer is obtained as a gel, by using a crosslinker.

Preferably, the polymer is a polymer gel containing the repeating unit of the general formula (1) in an amount of 90 to 99 mol %, and the repeating unit of the general formula (2) in an amount of 10 to 1 mol %, with 0.1 to 10% of the repeating units being crosslinked. Particularly preferably, the repeating unit of the general formula (1) accounts for 95 to 98 mol %, and the repeating unit of the general formula (2) accounts for 5 to 2 mol %, and 0.5 to 1% of the repeating units are crosslinked.

Further, the polymer preferably contains cyclodextrin in a proportion of 1.0 to 5.0 mol %, particularly preferably 2.0 to 5.0 mol % with respect to the whole polymer having the repeating units of the general formulae (1) and (2).

The following describes a specific producing process of the polymer gel having the repeating units of the general formulae (1) and (2).

The polymer having the repeating units of the general formulae (1) and (2) is produced by the radical polymerization of the monomers of the general formulas (4) and (5) with a crosslinker. Typically, the monomers of the general formulae (4) and (5), a crosslinker, and, optionally, a radical polymerization initiator are mixed and stirred in a vessel flushed with inert gas, or in a vacuum-deaerated vessel.

The radical polymerization reaction may be performed either solvent-free, or with a solvent (an organic solvent or an aqueous solvent) commonly used in radical polymerization. Examples of the organic solvent include benzene, toluene, N,N-dimethylformamide (DMF), dimethylsulfoxide (DMSO), acetone, chloroform, carbon tetrachloride, tetrahydrofuran (THF), ethyl acetate, chlorobenzene, dichlorobenzene, trifluoromethylbenzene, and anisole. Examples of the aqueous solvent include water, and solvents that contain, for example, methanol, ethanol, isopropanol, n-butanol, ethyl cellosolve, butyl cellosolve, and 1-methoxy-2-propanol, as required.

When used, the amount of the solvent may be appropriately adjusted. For example, the solvent is typically used in 0.1 to 1 liter, preferably 0.2 to 0.5 liters with respect to the total amount 1 mole of the monomers used for the polymerization.

The crosslinker may be any known crosslinker. For example, N,N'-methylene-bisacrylamide is preferably used.

The radical polymerization reaction may be performed in the presence or absence of a radical polymerization initiator. Typically, the radical polymerization reaction is preferably performed in the presence of a radical polymerization initiator. The radical polymerization reaction may involve spontaneous thermal polymerization in the absence of a radical polymerization initiator, or photoirradiation in the presence or absence of a radical polymerization initiator. In the case of photoirradiation radical polymerization, a light source such as a mercury lamp or a xenon lamp is typically used for the polymerization. The light source may be appropriately selected taking into consideration factors such as the type of the vinyl monomer, and the type of the polymerization initiator used.

2. Guest Body

The guest body of the present invention is formed from a macromolecule having one or more guest groups on the side chains.

The guest group may be any group that can be a guest group for a corresponding host group. Examples include alkyl groups that may have a substituent or substituents, cycloalkyl groups, and aryl groups that may have a substituent or substituents.

Examples of the macromolecules having one or more guest groups on the side chains include polymers having the repeating units represented by the general formulae (1) and (3). The number of repeating units (n, l) in the polymers represented by the general formulae (1) and (3) is 1 to 200,000, preferably 5,000 to 15,000.

The polymers having the repeating units represented by the general formulae (1) and (3) can be produced by, for example, the reaction of the monomer of the following general formula (4) with the monomer of the general formula (6) below.

[Chem. 9]

wherein X represents a hydroxyl group, C(O)NH$_2$, or C(O)OH.

[Chem. 10]

wherein A represents O or NH, and R represents an optionally-substituted alkyl group, or an optionally-substituted aryl group.

Any known monomer compounds may be used as the water-soluble monomers represented by the general formula (4). The monomer compounds may be used either alone or in a combination of two or more. It is particularly preferable to use the same monomer compounds used for the host body.

Particularly preferred as the monomer of the general formula (4) is the compound in which X is C(O)NH$_2$, specifically, acrylamide.

Examples of the alkyl groups, which may be optionally substituted, represented by R in the general formula (6) include linear, branched, or cyclic alkyl groups of C1 to C18. Specific examples include alkyls such as methyl, ethyl, n-propyl, isopropyl, n-butyl, isobutyl, sec-butyl, tert-butyl, pentyl, cyclopentyl, hexyl, cyclohexyl, isohexyl, dodecyl, octadecyl, and adamantyl. Of these, adamantyl and butyl are preferred, and adamantyl is particularly preferred. The alkyl group may have 1 to 3 substituents, for example, such as halogen atoms (for example, such as fluorine, chlorine, and bromine), carboxyl groups, ester groups, amide groups, and hydroxyl groups that may be protected. Further, the alkyl group may be one in which the organometal complex ferrocene is attached as a substituent.

Examples of the aryl groups, which may be optionally substituted, represented by R in the general formula (6) include monocyclic aryl groups, and aryl groups with two or more rings. Specific examples include phenyl, toluoyl, xylyl, naphthyl, anthryl, and phenanthryl. The aryl group may have 1 to 3 substituents, for example, such as alkyl groups (for example, such as C1 to C18 alkyl groups), halogen atoms (for example, such as fluorine, chlorine, and bromine), carboxyl groups, ester groups, amide groups, azo groups having aryl groups, and hydroxyl groups that may be protected.

The monomer of the general formula (6) is produced by the reaction of acryloyl chloride with an alkyl amine or an aryl amine that provides an alkyl or an aryl for the substituent R. Typically, acryloyl chloride is mixed and stirred in a solvent with an alkyl amine or an aryl amine that provides an alkyl or an aryl for the substituent R.

The same solvent used for the production of the monomer of the general formula (5) may be used in the reaction. When used, the amount of the solvent may be appropriately adjusted.

The monomer of the general formula (6) may also be produced by using a method in which 1,1'-carbonyldiimidazole (CDI) or 1-ethyl-3-(3-dimethylaminopropyl)carbodiimidehydrochloride (EDC) is added to acrylic acid under ice-cooled conditions, and aminocyclodextrin is added to the mixture and stirred overnight to form an amide bond. Alternatively, the monomer of the general formula (6) may be produced by obtaining an amide compound from acrylic acid via an active ester, using dicyclohexylcarbodiimide (DCC) and 1-hydroxybenzotriazole (HOBt) or N-hydroxysuccinimide (HOSu) as condensing agents.

The monomer of the general formula (6), and the known monomer of the general formula (4) are reacted to produce the polymer having the repeating units of the general formulae (1) and (3). Preferably, the polymer is obtained as a gel, by using a crosslinker.

Preferably, the polymer is a polymer gel containing the repeating unit of the general formula (1) in an amount of 90 to 99 mol %, and the repeating unit of the general formula (3) in an amount of 10 to 1 mol %, with 0.1 to 10% of the repeating units being crosslinked. Particularly preferably, the repeating unit of the general formula (1) accounts for 95 to 98 mol %, and the repeating unit of the general formula (3) accounts for 5 to 2 mol %, and 0.5 to 1% of the repeating units are crosslinked.

Further, the polymer gel preferably contains the guest group in a proportion of 1.0 to 5.0 mol %, particularly preferably 2.0 to 5.0 mol % with respect to the whole polymer having the repeating units of the general formulae (1) and (3).

The polymer gel having the repeating units of the general formulae (1) and (3) is produced by using the same process used to produce the polymer gel having the repeating units of the general formulae (1) and (2).

3. Polymer Having Host Group and Guest Group

In the present invention, the polymer having one or more host groups and one or more guest groups on the side chains is a polymer having the repeating units of the following general formulae (2) and (3)

[Chem. 11]

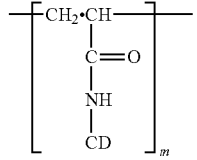

(2)

wherein CD represents α-cyclodextrin, β-cyclodextrin, or γ-cyclodextrin, and m is 1 to 200,000.

[Chem. 12]

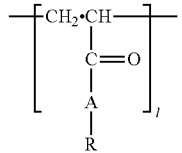

(3)

wherein A represents O or NH, R represents an optionally-substituted alkyl group, or an optionally-substituted aryl group, and l is 1 to 200,000.

The number of repeating units (m, l) in the polymer having the repeating units of the general formulae (2) and (3) is 1 to 200,000, preferably 5,000 to 15,000.

The polymer having the repeating units of the general formulae (2) and (3) may be produced, for example, by the reaction of the monomer of the general formula (5) described in Section 1. above with the monomer of the general formula (6) described in Section 2.

In the reaction, the monomer of the general formula (4) may be further polymerized. Preferably, the polymer is obtained as a gel, by using a crosslinker.

Preferably, the polymer is a polymer gel containing the repeating unit of the general formula (2) in an amount of 40 to 60 mol %, and the repeating unit of the general formula (3) in an amount of 60 to 40 mol %, with 0.1 to 10% of the repeating units being crosslinked. Particularly preferably, the repeating unit of the general formula (2) accounts for 50 mol %, and the repeating unit of the general formula (3) accounts for 50 mol %, and 0.5 to 1% of the repeating units are crosslinked.

Further, the polymer gel preferably contains the one or more host groups in a proportion of 40 to 60 mol %, particularly preferably 50 mol %, and the guest group in a proportion of 60 to 40 mol %, particularly preferably 50 mol % with respect to the whole polymer having the repeating units of the general formulae (2) and (3).

The polymer gel having the repeating units of the general formulae (2) and (3) is produced by using the same process used to produce the polymer gel having the repeating units of the general formulae (1) and (2).

4. Assembly

The assembly of the present invention is obtained by bringing into contact (i) the host body and the guest body, (ii) the polymers having the host group and the guest group on the side chains, (iii) the host body and the polymer having the host group and the guest group on the side chains, and (iv) the guest body and the polymer having the host group and the guest group on the side chains.

Particularly preferably, the assembly of the present invention can be obtained by bringing into contact the host body, the guest body, and the polymer having the host group and the guest group on the side chains in gel form in an aqueous solvent.

Specifically, by taking the contact between the host body and the guest body as an example, a host body gel and a guest body gel are placed in an aqueous solvent, and brought into contact with each other under vibration or stirring.

Examples of the aqueous solvent include water, aqueous solutions that contain salts such as sodium phosphate and sodium carbonate as required, and mixed solvents of, for example, alcohol and water. The aqueous solvent is preferably water.

Any means can be used as the vibration or stirring method, as long as the host body and the guest body can be brought close to each other within a certain distance. Examples include methods that use a stirrer or a shaking machine such as a vortex mixer and a shaker, and methods that irradiate ultrasonic waves.

The same solvent, and the same vibration or stirring method may be used for the polymer having the host group and the guest group on the side chains.

As used herein, the term assembly is used to refer to a form in which the host body and the guest body, or the polymers having the host group and the guest group on the side chains contact and adhere to each other on their surfaces.

The assembly of the present invention occurs, for example, as the host body and the guest body are brought close to each other within a certain distance, and attract and adhere to each other over the adjacent surfaces. In the present invention, the adhesion between the host body and the guest body is selective as determined by the combination of the host body and the guest body. Likewise, the adhesion between the polymers having the host group and the guest group on the side chains is also selective as determined by the combination of the host group and the guest group. Specifically, the adhesion is based on molecular recognition, and the certain distance and the attraction force by which the host body (group) and the guest body (group) attract each other is determined by the combination of the host body (group) and the guest body (group).

Adhesion occurs when the guest body (group) has a size that can be accommodated by the internal space of the host body (group), and when the guest body (group) has interactions with the host body (group) (interactions that involve at least one of hydrophobic interaction (Van der Waals force), hydrogen bonding, electrostatic interaction, and coordinate bonding).

The selectivity is believed to involve association constant (K).

Here, association constant (K) is a value determined from NMR peak shifts by using the Benesi-Hildebrand method, as described below in detail.

Cyclodextrin is added to a guest molecule of a certain concentration (the concentration of the guest sites in the monomer or polymer is held constant), and a signal shift originating in the guest sites is measured. When the signal shift amount is $\Delta\delta$, (and when the maximum shift amount (the shift amount of when the cyclodextrin binds to all the guest sites) is $\Delta\delta max$), the association constant K is calculated as follows.

$$1/\Delta\delta = (1/K\Delta\delta max) \cdot (1/[\text{cyclodextrin}]) + 1/\Delta\delta max \quad \text{Equation:}$$

Here, $\Delta\delta max$ can be calculated from the ordinate intercept, and K from the slope (and the $\Delta\delta max$ determined first) by plotting $1/\Delta\delta$ and $1/[\text{cyclodextrin}]$ against the vertical axis and the horizontal axis (a double reciprocal plot of $\Delta\delta$ and [cyclodextrin]).

In the assembly of the present invention, the association constant between the host body (group) and the guest body (group) is preferably about 50 or more.

For example, when $\alpha$-cyclodextrin (cavity size: 4.7 to 5.2 Å) is used as the host body (group), examples of the guest body (group) that satisfies the foregoing conditions include alkyl compounds of 4 to 18 carbon atoms, alcohol derivatives thereof, carboxylic acid derivatives, amino derivatives, azobenzene derivatives having a cyclic alkyl group or a phenyl group, and cinnamic acid derivatives. Examples of the alkyl compounds (groups) of 4 to 18 carbon atoms include n-butyl, pentyl, hexyl, heptyl, octyl, nonyl, decyl, undecyl, dodecyl, tridecyl, tetradecyl, pentadecyl, hexadecyl, heptadecyl, and octadecyl.

When $\beta$-cyclodextrin (cavity size: 6.0 to 6.5 Å) is used, examples of the guest body (group) that satisfies the foregoing conditions include t-butyl, adamantyl, aromatic compounds and alcohol derivatives thereof, carboxylic acid derivatives, amino derivatives, ferrocene derivatives, azobenzene, naphthalene derivatives, and dansyl.

When $\gamma$-cyclodextrin (cavity size: 7.5 to 8.5 Å) is used, examples of the guest body (group) that satisfies the foregoing conditions include alkyl of up to 18 carbon atoms, alcohol derivatives thereof, carboxylic acid derivatives, amino derivatives, adamantyl, clusters of carbon atoms (such as fullerene), aromatic dansyl, ferrocene derivatives, and anthracene derivatives.

The break strength of the assembly tends to increase as the association constant between the host body and the guest body increases. Preferably, the assembly has a break strength of 200 to 1,000 kPa, and a fracture elongation of 10 to 90%.

The polymers having the host group and the guest group on the side chains adhere in the same manner as in the adhesion of the host body and the guest body. The polymer gel having the host group and the guest group on the side chains can remain adherent even when cut, because any cut in the gel exposes the host group and the guest group.

The present invention enables selective adhesion of macroscale materials based on molecular recognition. Further, the present invention enables selective adhesion and self-assembly, and selective adhesion in water upon appropriately selecting host-guest molecules.

Because the present invention enables selective adhesion of macroscale materials based on host-guest molecular recognition, selective adhesion and self-assembly can take place at an adhesion strength that can be adjusted by appropriately selecting host-guest molecules. The present invention also enables selective adhesion in water.

Thus, by taking advantage of the selectivity, the selective adhesion and self-assembly based on molecular recognition of the present invention has applications, for example, such as in cell and tissue fixing material, organ adhesion inhibiting material, alternative suture material, and DDS material. Further, because the adhesion and self-assembly occurs at macroscale, the invention is also applicable to, for example, sensor materials. Further, because the adhesion can take place in a gel state, the invention has potential application in plastic processing techniques that involve drying of the adhered product for production of small and hard assemblies.

EXAMPLES

The present invention is described below in greater detail using Examples. It should be noted, however, that the invention is not limited by the descriptions of the following Examples.

Measurement Devices

The following devices were used for the measurements of various properties in the Examples and Comparative Examples.

$^1$H-NMR: JEOL ECA-500 (500 MHz)

MS: Shimadzu Corporation AXIMA-CFR (time-of-flight)

Elemental analysis: Yanaco, CHNCORDER MT-6 (differential thermal conductivity method)

Break strength and elongation: Rhenoner, RE-33005, Yamaden Ltd. (test piece: 1 cm×1 cm; pulling rate: 0.1 mm/sec; measurement temperature: room temperature)

Production of Host Body Polymerization Monomer

Production Example 1

6-acrylamide-α-cyclodextrin

6-Amino-α-cyclodextrin (0.58 g; 0.60 mmol) was dissolved in a 50-ml NaHCO$_3$ aqueous solution (0.5 g), and the pH of the solution was brought to about 10 with NaOH. Acryloyl chloride (90 µl; 1.2 mmol) was added to the 6-amino-α-cyclodextrin solution on an ice bath, and the mixture was stirred for 6 hours. After the reaction, the mixture was concentrated to about 50% of the total amount, and poured into acetone (500 mL). Thereafter, the precipitate was collected by centrifugation, and dried overnight in a vacuum oven. The resulting crude product was generated by reversed-phase chromatography with HP-20 polystyrene gel (methanol/water) to give 6-acrylamide-α-cyclodextrin (0.49 g; yield: 79%).

$^1$H-NMR (DMSO-d$_6$): δ8.00 (t, 1H, amido), 6.27 (dd, 1H, olefin), 6.02 (d, 1H, olefin), 5.58-5.34 (d, 1H, olefin, m, 13H, O$_2$, $_3$H of CD), 4.89-4.74 (m, 6H, C$_1$H of CD), 4.54-4.38 (m, 5H, O$_6$H of CD), 3.84-3.20 (m, overlaps with HOD)

MALDI-TOF MS; m/z=1025.3 ([C$_{39}$H$_{63}$NO$_{30}$+Na]+= 1048.3) [C$_{39}$H$_{63}$NO$_{30}$+K]+=1064.4)

Elemental analysis (C$_{39}$H$_{63}$NO$_{30}$ (H$_2$O)$_6$): C, 41.31; H, 6.67; N, 1.24.

Measurement result: C, 41.24; H, 6.36; N, 1.30.

Production Example 2

6-acrylamide-β-cyclodextrin

6-Amino-β-cyclodextrin (0.68 g; 0.60 mmol) was dissolved in a 50-ml NaHCO$_3$ aqueous solution (0.5 g), and the pH of the solution was brought to about 10 with NaOH. Acryloyl chloride (90 µl; 1.2 mmol) was added to the 6-amino-β-cyclodextrin solution on an ice bath, and the mixture was stirred for 6 hours. After the reaction, the mixture was concentrated to 10% of the total amount, and poured into acetone (500 mL). Thereafter, the precipitate was collected by centrifugation, and dried overnight in a vacuum oven. The resulting crude product was generated by reversed-phase chromatography with HP-20 polystyrene gel (methanol/water) to give 6-acrylamide-β-cyclodextrin (0.53 g; yield: 74%).

$^1$H-NMR (DMSO-d$_6$): δ7.90 (t, 1H, amido), 6.27 (dd, 1H, olefin), 6.02 (d, 1H, olefin), 5.90-5.60 (d, 1H, olefin, m, 15H, O$_2$, $_3$H of CD), 4.89-4.74 (m, 7H, C$_1$H of CD), 4.54-4.38 (m, 6H, O$_6$H of CD), 3.84-3.20 (m, overlaps with HOD)

MALDI-TOF MS; m/z=1208.0 ([C$_{45}$H$_{73}$NO$_{35}$+Na]+= 1210.4), 1223.8 ([C$_{45}$H$_{73}$NO$_{35}$+K]+=1226.5)

Elemental analysis (C$_{45}$H$_{73}$NO$_{35}$(H$_2$O)$_{3.32}$): C, 41.54; H, 6.17; N, 1.07.

Measurement result: C, 41.54; H, 6.37; N, 1.16.

Production of Guest Body Polymerization Monomer

Production Example 3

N-(1-adamantyl)acrylamide

1-Adamantylamine (0.76 g; 5.0 mmol) and triethylamine (0.77 ml; 5.5 mmol) were dissolved in dry THF (40 mL) on an ice bath. After dropping acryloyl chloride (0.45 ml; 5.5 mmol) onto the solution, the mixture was stirred for 4 hours. After the reaction, the precipitate was removed by filtration, and the supernatant liquid was concentrated under reduced pressure. The resulting crude product was recrystallized from chloroform to give N-(1-adamantyl)acrylamide (0.85 mg; yield: 83%).

$^1$H-NMR ((CD$_3$)SO): δ6.15 (dd, 1H, olefin), 5.96 (dd, 1H, olefin), 5.56 (dd, 1H, olefin), 5.56 (dd, 1H, olefin), 5.15 (brs, 1H, NH), 2.06 (m, 9H, adamantine), 1.59 (m, 6H, adamantine)

MALDI-TOF MS; m/z=228.6 ([C$_{13}$H$_{19}$NO+Na]+=228.1) [C$_{39}$H$_{63}$NO$_{30}$+K]+=244.4)

Elemental analysis (C$_{13}$H$_{19}$NO(H$_2$O)$_{0.16}$): C, 74.09; H, 9.24; N, 6.64.

Measurement result: C, 74.06; H, 9.18; N, 6.61.

Production of Host Body Macromolecule

Polymerization Example 1

The 6-acrylamide-β-cyclodextrin (6.8 mmol) obtained in Production Example 2, and acrylamide (340 mmol) were subjected to a radical polymerization reaction in water, using ammonium persulfate (APS; 0.006 mmol) and N,N,N',N'-tetramethylethylenediamine (TMEDA; 0.006 mmol) as initiators. After 12 hours of reaction, the unreactant was removed by dialysis. The resulting solution was concentrated under reduced pressure to give a host macromolecule (yield 87%).

$^1$H NMR (500 MHz, D$_2$O): δ5.20-5.10 (m, 7H, C$_1$H of CD), 4.10-3.60 (m, 42H, C$_{2,3,4,5,6}$H of CD), 2.50-2.10 (methine proton of the polymer main chain), 2.00-1.50 (methylene proton of the polymer main chain).

Polymerization Example 2

A host macromolecule (yield 83%) was obtained in the same manner as in Polymerization Example 1, except that the 6-acrylamide-α-CD obtained in Production Example 1 was used in place of the 6-acrylamide-β-CD.

$^1$H NMR (500 MHz, D$_2$O): δ5.20-5.10 (m, 6H, C$_1$H of CD), 4.10-3.60 (m, 36H, C$_{2,3,4,5,6}$H of CD), 2.50-2.10 (methine proton of the polymer main chain), 2.00-1.45 (methylene proton of the polymer main chain).

Production of Guest Body Macromolecule

Polymerization Example 3

The N-(1-Ad)acrylamide (0.62 mmol) obtained in Production Example 3, and acrylamide (31 mmol) were subjected to a radical polymerization reaction in dimethylsulfoxide (DMSO; 30 ml) at 60° C., using 2,2'-azobis(isobutyronitrile) (AIBN; 0.04 mmol).

After 12 hours of reaction, the mixture was reprecipitated with methanbl, and dried under reduced pressure to obtain a crude product. This procedure was repeated three times to produce a guest macromolecule (yield 93%).

$^1$H NMR (500 MHz, D$_2$O): δ2.50-1.95 (methine proton of the polymer main chain, adamantane proton), 1.95-1.40 (methylene proton of the polymer main chain, adamantane proton).

Production of Host Body Gel

Crosslink Example 1

The 6-acrylamide-β-CD (0.31 mmol) obtained in Production Example 2, acrylamide (6.2 mmol), and N,N'-methylenebis(acrylamide) (0.03 mmol) were subjected to a radical polymerization reaction in water to obtain a host body gel, using APS (0.0013 mmol) and TMEDA (0.0052 mmol) as initiators.

Crosslink Example 2

A host body gel was obtained in the same manner as in Crosslink Example 1, except that the 6-acrylamide-α-CD obtained in Production Example 1 was used in place of the 6-acrylamide-β-CD.

Production of Guest Body Gel

Crosslink Example 3

The N-(1-Ad)acrylamide (0.32 mmol) obtained in Production Example 3, acrylamide (6.2 mmol), and N,N'-methylenebis(acrylamide) (0.12 mmol) were subjected to a radical polymerization reaction in DMSO (3.5 ml) at 63° C., using AIBN (0.03 mmol). After 12 hours of reaction, the solvent in the gel was displaced with water in repeating fashion to obtain a guest body gel.

Crosslink Example 4

A guest body gel was obtained in the same manner as in Crosslink Example 3, except that n-butyl acrylate (Tokyo Chemical Industry Co., Ltd.) was used in place of the N-(1-Ad) acrylamide.

Crosslink Example 5

A guest body gel was obtained in the same manner as in Crosslink Example 3, except that t-butyl acrylate (Tokyo Chemical Industry Co., Ltd.) was used in place of the N-(1-Ad) acrylamide.

Contacting of Gels

The Gels obtained in Crosslink Examples 1 to 5 were each cut into a cube measuring 3 mm×3 mm×3 mm.

For the visual inspection of assembly formation, the gel having β-CD obtained in Crosslink Example 1 was dyed red by being dipped in a red dye (erythrosine, red 3) solution.

In the same manner, the gel having α-CD obtained in Crosslink Example 2 was dyed blue (brilliant blue, blue 1), the gel having Ad obtained in Crosslink Example 3 was dyed pale green (malachite green, or a mixture of low-concentration blue 1 and yellow 4), the gel having n-Bu group obtained in Crosslink Example 4 was dyed yellow (tartrazine, yellow 4), and the gel having t-Bu group obtained in Crosslink Example 5 was dyed green (a mixture of blue 1 and yellow 4).

Example 1

The gel having the host group β-CD (Crosslink Example 1), and the gel having the guest group Ad (Crosslink Example 3) were placed in a petri dish, and vibrated at room temperature for several minutes with EYELA CM-1000 after adding water (5 mL).

As shown in FIG. 1, the β-CD-containing host body gel and the Ad-containing guest body gel attracted each other when brought close to each other, and strongly adhered to each other and formed an assembly.

Figure 3:
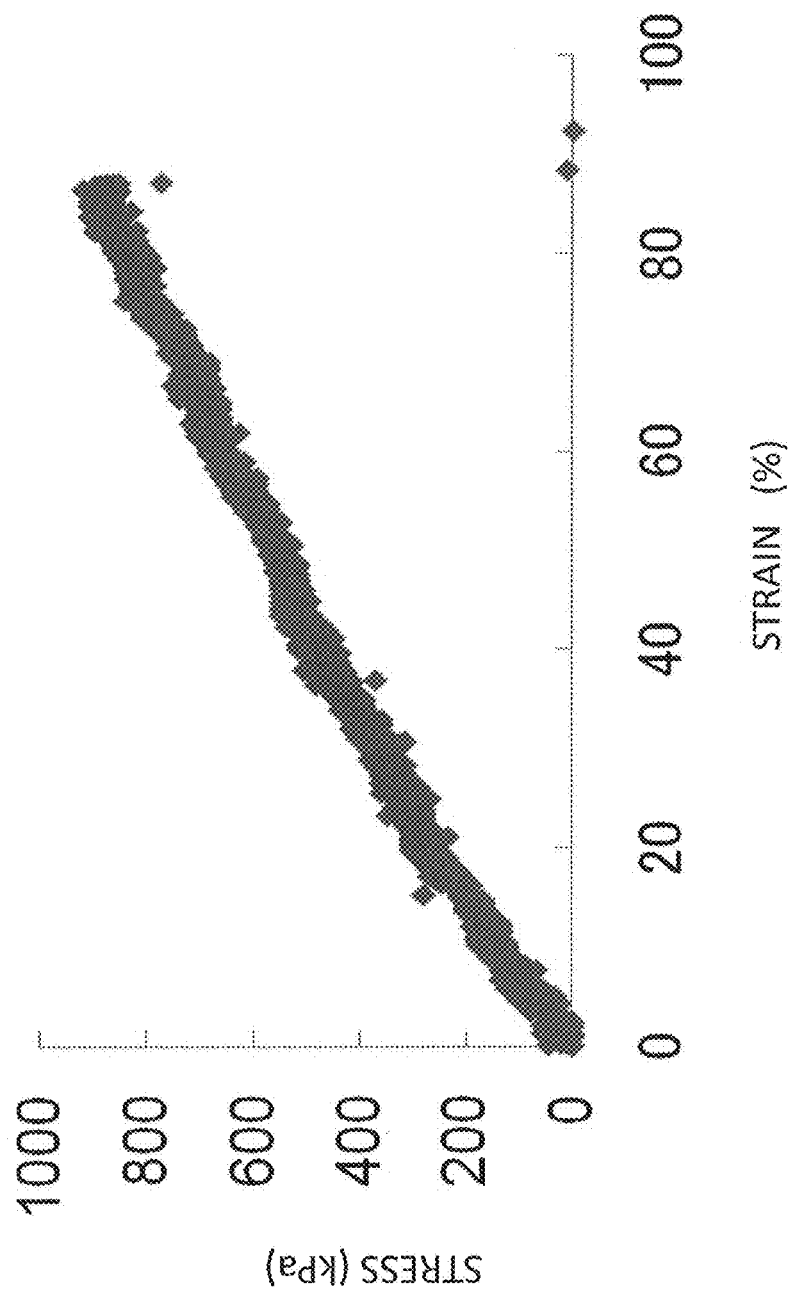
FIG. 3 is a graph representing a stress-strain curve of an assembly formed by the adhesion of a n-CD-gel (host body gel) and an Ad-gel (guest body gel).

The assembly was measured for fracture elongation and break strength. The resulting stress-strain curve is represented in FIG. 3. The measurement results are presented in Table 1.

Example 2

The gel having the host group α-CD (Crosslink Example 2), and the gel having the guest group Ad (Crosslink Example 3) were placed in a petri dish, and vibrated at room temperature for several minutes with EYELA CM-1000 after adding water (5 mL).

The α-CD-containing host body gel and the Ad-containing guest body gel attracted each other when brought close to each other, and adhered to each other and formed an assembly.

The assembly was measured for fracture elongation and break strength. The results are presented in Table 1.

Example 3

The gel having the host group β-CD (Crosslink Example 1), the gel having the host group α-CD (Crosslink Example 2), the gel having the guest group n-Bu (Crosslink Example 4), and the gel having the guest group t-Bu (Crosslink Example 5) were placed in a petri dish, and vibrated at room temperature for several minutes with EYELA CM-1000 after adding water (5 mL).

Figure 2:
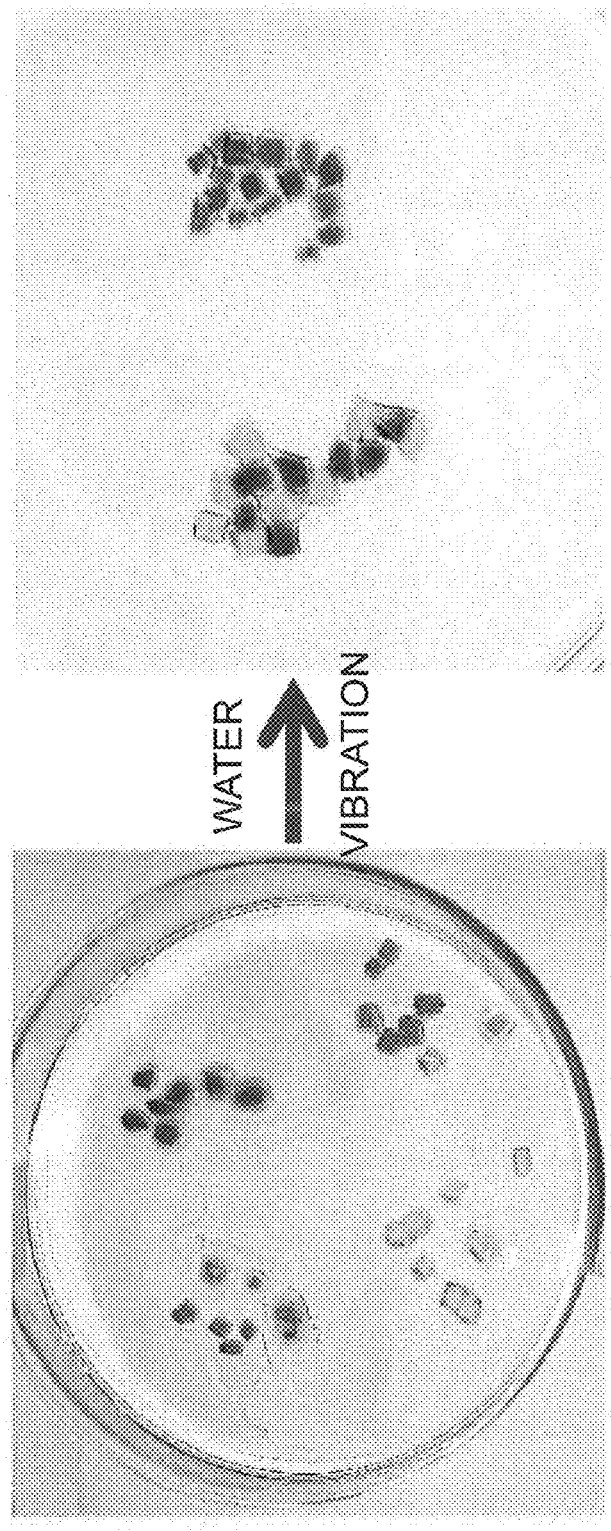
FIG. 2 is an image showing how a β-CD-gel and an α-CD-gel (host body gels) selectively adhere to an n-Bu-gel and a t-Bu-gel (guest body gels) and form self-assemblies.

As shown in FIG. 2, the β-CD-containing host body gel did not adhere to the n-Bu group-containing guest body gel, and selectively formed an assembly only with the t-Bu group-containing guest body gel. The α-CD-containing host body gel did not adhere to the t-Bu group-containing guest body gel, and selectively formed an assembly only with the n-Bu group-containing guest body gel.

The assemblies were measured for fracture elongation and break strength. The results are presented in Table 1.

TABLE 1

| Host gel | Guest gel | Adhesion[a] | Break strength (kPa) | Fracture elongation (%) | Association constant (Ka/M$^{-1}$)[b] |
|---|---|---|---|---|---|
| Ex. 1 | β-CD-gel | Ad-gel | Excellent | 900 | 85 | 1,500 |
| Ex. 2 | α-CD-gel | Ad-gel | Good | 750 | 65 | 98 |
| Ex. 3 | α-CD-gel | n-Bu-gel | Good | 200 | 15 | 57 |
|  | α-CD-gel | t-Bu-gel | Poor | — | — | ≈15 |
|  | β-CD-gel | n-Bu-gel | Poor | — | — | <10 |
|  | β-CD-gel | t-Bu-gel | Good | 700 | 18 | 170 |

[a]Excellent means strong adhesion; Good means adhesion; Poor means no adhesion
[b]Calculated from $^1$H NMR according to Benesi-Hildebrand method It can be seen from the results presented in Table 1 that the assemblies with larger association constants have larger break strengths.

The invention claimed is:

1. An assembly comprising one or more host bodies formed from a macromolecule having one or more host groups in the side chains, and one or more guest bodies formed from a macromolecule having one or more guest groups in the side chains, wherein the one or more host bodies and the one or more guest bodies are in contact with each other and form the assembly, wherein the one or more host bodies are a gel of a crosslinked polymer having repeating units represented by the following general formulae (1) and (2), and the one or more guest bodies are a gel of a crosslinked polymer having repeating units represented by the following general formulae (1) and (3):

[Chem. 1]

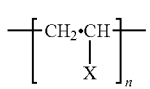
(1)

wherein X represents a hydroxyl group, $C(O)NH_2$, or $C(O)OH$, and n is 1 to 200,000,

[Chem. 2]

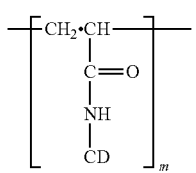
(2)

wherein CD represents α-cyclodextrin, β-cyclodextrin, or γ-cyclodextrin, and m is 1 to 200,000,

[Chem. 3]

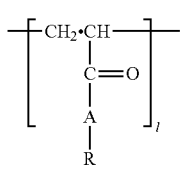
(3)

wherein A represents O or NH, R represents an optionally-substituted alkyl group, or an optionally-substituted aryl group, and l is 1 to 200,000,
the host groups corresponding to the group CD in general formula (2), and the guest groups corresponding to the group R in general formula (3).

2. An assembly according to claim 1, wherein the association constant between the one or more host bodies and the one or more guest bodies is 50 or more.

3. An assembly according to claim 1, wherein the one or more host bodies are a copolymer of acrylamide and an acrylamide that has cyclodextrin on the side chain.

4. An assembly according to claim 1, wherein the one or more guest bodies are a copolymer of acrylamide and an acryl compound selected from the group consisting of an alkyl ester of acrylic acid, an aryl ester of acrylic acid, and an acrylamide having a cycloalkyl group on the side chain.

5. A method for causing one or more host bodies formed from a macromolecule having one or more host groups on the side chains, and one or more guest bodies formed from a macromolecule having one or more guest groups on the side chains to selectively adhere to each other through contact in an aqueous solvent, the method comprising the step of contacting the macromolecule having one or more host groups on the side chains with the macromolecule having one or more guest groups on the side chain, wherein the one or more host bodies are a gel of a crosslinked polymer having repeating units represented by the following general formulae (1) and (2), and the one or more guest bodies are a gel of a crosslinked polymer having repeating units represented by the following general formulae (1) and (3):

[Chem. 4]

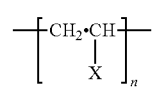
(1)

wherein X represents a hydroxyl group, $C(O)NH_2$, or $C(0)OH$, and n is 1 to 200,000,

[Chem. 5]

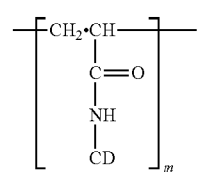
(2)

wherein CD represents α-cyclodextrin, β-cyclodextrin, or γ-cyclodextrin, and m is 1 to 200,000,

[Chem. 6]

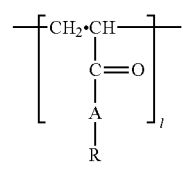
(3)

wherein A represents O or NH, R represents an optionally-substituted alkyl group, or an optionally-substituted aryl group, and l is 1 to 200,000,
the host groups corresponding to the group CD in general formula (2), and the guest groups corresponding to the group R in general formula (3).

6. An assembly according to claim 1, wherein the one or more host bodies are a gel of a crosslinked polymer having repeating units represented by the following general formulae (1), (2) and (3), and the one or more guest bodies are a gel of a crosslinked polymer having repeating units represented by the following general formulae (1), (2) and (3):

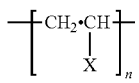
(1)

wherein X represents a hydroxyl group, C(O)NH$_2$, or C(O)OH, and n is 1 to 200,000,

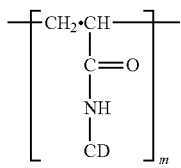
(2)

wherein CD represents α-cyclodextrin, β-cyclodextrin, or γ-cyclodextrin, and m is 1 to 200,000,

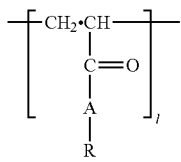
(3)

wherein A represents O or NH, R represents an optionally-substituted alkyl group, or an optionally-substituted aryl group, and l is 1 to 200,000,
the host groups corresponding to the group CD in general formula (2), and the guest groups corresponding to the group R in general formula (3).

7. A method for causing one or more host bodies formed from a macromolecule having one or more host groups on the side chains, and one or more guest bodies formed from a macromolecule having one or more guest groups on the side chains to selectively adhere to each other through contact in an aqueous solvent, the method comprising the step of contacting the macromolecule having one or more host groups on the side chains with the macromolecule having one or more guest groups on the side chain, wherein the one or more host bodies are a gel of a crosslinked polymer having repeating units represented by the following general formulae (1), (2) and(3), and the one or more guest bodies are a gel of a crosslinked polymer having repeating units represented by the following general formulae (1), (2) and (3):

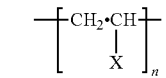
(1)

wherein X represents a hydroxyl group, C(O)NH$_2$, or C(O)OH, and n is 1 to 200,000,

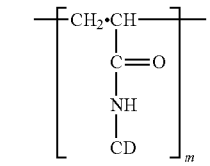
(2)

wherein CD represents α-cyclodextrin, β-cyclodextrin, or γ-cyclodextrin, and m is 1 to 200,000,

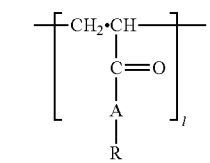
(3)

wherein A represents O or NH, R represents an optionally-substituted alkyl group, or an optionally-substituted aryl group, and l is 1 to 200,000,
the host groups corresponding to the group CD in general formula (2), and the guest groups corresponding to the group R in general formula (3).

8. A method according to claim 7, wherein the contact between the one or more host bodies and the one or more guest bodies is re-contact made after the assembly is cut.

* * * * *